May 12, 1964

L. HORNBOSTEL ETAL 3,132,991

PULP MOLDING MACHINE

Filed Feb. 10, 1961

INVENTOR.
Lloyd Hornbostel
Charles W. Modersohn
BY
ATTORNEYS

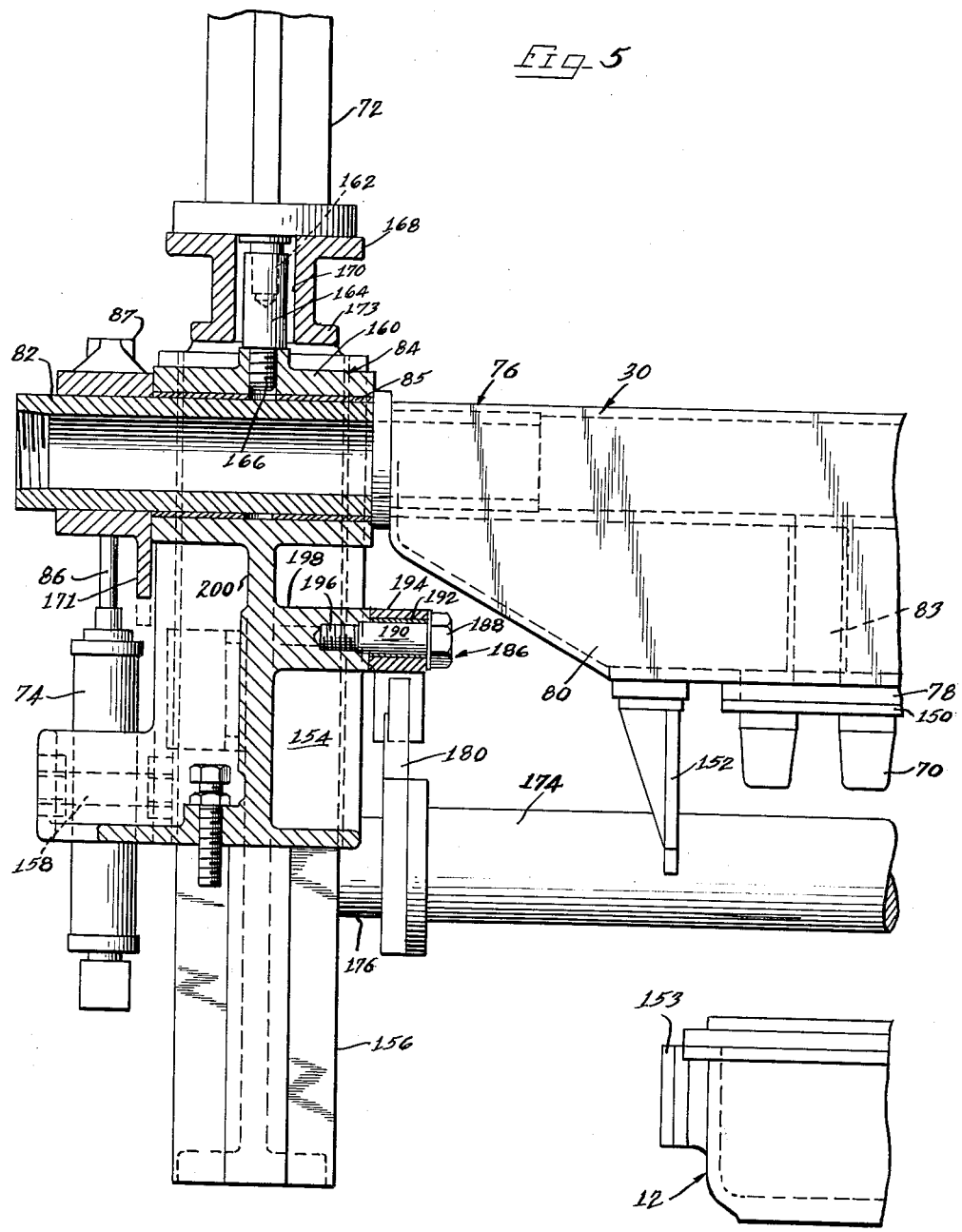

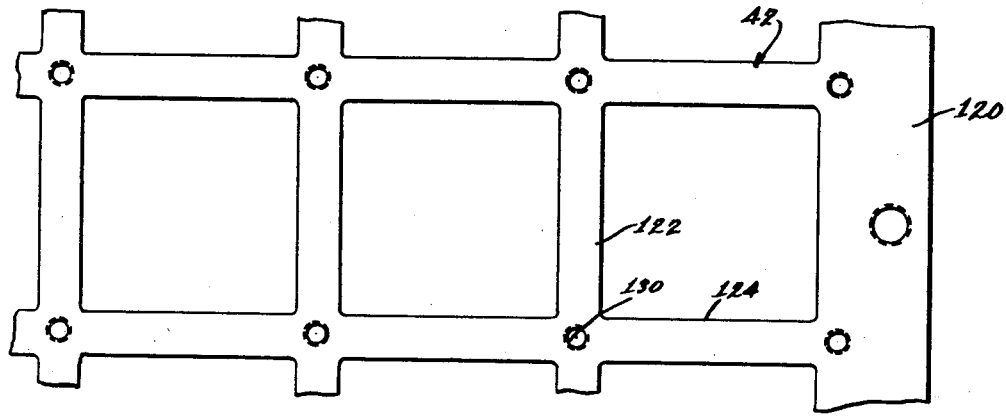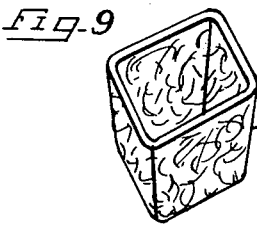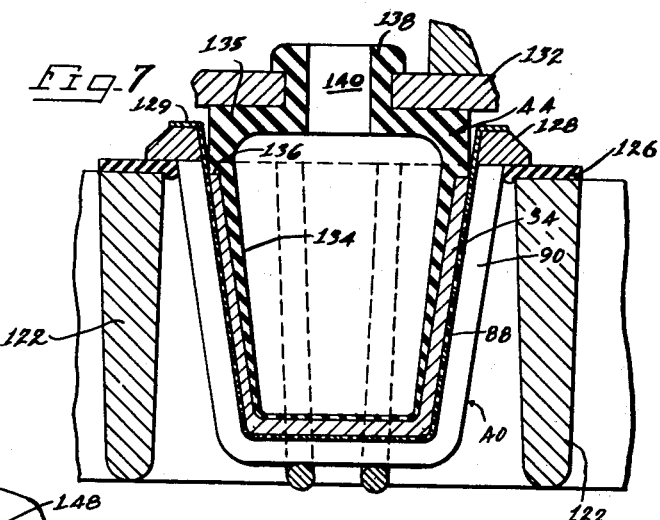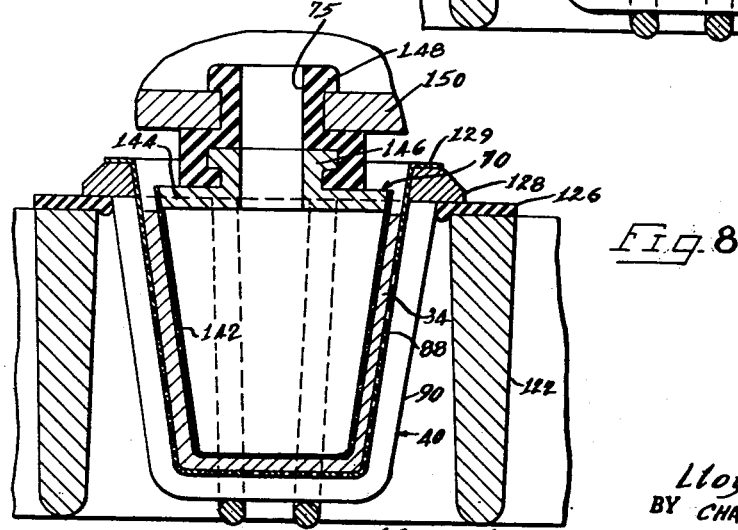
INVENTOR.
Lloyd Hornbostel
Charles W. Modersohn

3,132,991
PULP MOLDING MACHINE
Lloyd Hornbostel and Charles W. Modersohn, Beloit, Wis., assignors to Beloit Corporation, Beloit, Wis., a corporation of Wisconsin
Filed Feb. 10, 1961, Ser. No. 88,401
2 Claims. (Cl. 162—392)

This invention relates to a pulp molding machine, and more particularly to a machine for molding pots such as seed pots and other articles such as egg cartons, flower pots, or the like at a relatively high production rate and with reliability as to quality and continuity of the operation.

Heretofore, a variety of pulp molding machines have been available, but when these have been suitable for continuous or automatic production, it has generally been necessary to mold the given articles one at a time, and there has also generally been difficulty in the mating of the forming elements.

The present invention overcomes these difficulties, and provides for the simultaneous molding of a multiplicity of articles such as seed pots or the like in successive indexing stages, with the several steps being accomplished at a considerable rate of speed without interference between the mating elements.

In accordance with the invention, a cylindrical array of suction boxes is mounted on a rotor with the individual suction boxes each supporting a preferably large number of molds such as, for example, one hundred and thirty seed pot molds. The suction boxes are intermittently rotated for successive angular increments such that they are first positioned in register with a pan containing molding stock such as a fiber slurry, which is synchronously reciprocated into mold filling position by suitable means such as a cross-shaft and parallel linkage structure which operates smoothly to prevent "throwing" of the slurry. Also, air spring means may support the pan to serve as an adjustable counterbalance to maintain a smooth motion for the pan.

As the pan is elevated, the individual molds are submerged and suction is applied therethrough to deposit a layer of pulp therein. A valve plate structure is provided to maintain suction in the molds, the valve plate having partitions such that suction is maintained during successive index stations for the boxes, and pressure is applied thereafter.

The vertically reciprocating pan has an overflow portion from which excess stock is recirculated over the rim of an inner pan, and stock is supplied through stock inlets and injected into the inner pan through apertures so as to agitate the stock in the inner pan and prevent settling.

A bladder carrier is provided which carries a set of inflatable bladders complementary to the individual molds, the bladders being moved into engagement with the molds by an air cylinder means or the like and expanded by fluid pressure to express a substantial portion of the water from the articles thus formed. The suction applied to the molds assists in this operation.

An article take-off stage includes a second press arrangement which removes the formed articles and transfers them to a conveyor for carrying the articles to drying means of any suitable type. The second press arrangement includes a second set of mating molds whose construction may be similar to the molds in the individual suction boxes, and complementary thereto. However, the valve means previously referred to is effective to introduce air beneath the molds at the take-off stage. Correspondingly, the molds in the second press arrangement are subjected to vacuum to release the articles onto the conveyor whereby the articles are conducted into a drying oven or the like.

Any suitable driving means may be provided for the rotor carrying the suction boxes, such as to bring the successive suction boxes into alignment with the first and second pressing stages for forming and removing the articles. Likewise, the means for reciprocating the pan carrying the slurry for the articles may be a fluid reciprocating motor and air cylinder of suitable type.

Also in accordance with the invention, the individual suction boxes may include a grid or matrix defining individual openings configured and dimensioned to receive the molds, and the molds may include a foraminous inner screen backed by a coarse wire construction. The inner screen may have a peripheral upper flange overlying a rim mounted on the grid in position to be held down by a bracket engaging adjacent flanges and secured by a bolt or the like in the mold grid. Thus the mold structure may be readily assembled and disassembled, so that the molds may be individually inserted or removed from the spaces formed by the grid.

The bladder carrier includes means for selective rotation whereby the individual bladders are available for inspection or repair without dismantling the machines. Also, the take-off molds are mounted for reciprocation by a main cylinder means and are synchronously rotatable by a second cylinder and coacting linkage means.

Desirably, six indexing stations are provided for the rotor and in a final indexing station air pressure admitted through the valve means described (with or without water spray) serves to backwash the individual molds.

However, the operation may be continuous, with but a short period of time being necessary for the stationary positions of the rotor and correspondingly short periods of time for rotation between the stationary positions.

Accordingly, it is an object of the present invention to provide a pulp molding machine which forms an unusually large number of articles simultaneously.

Another object of the invention is to provide a pulp molding machine as described which may be operated continuously.

Another object of the invention is to provide a pulp molding machine as described which affords an easy engagement between mating mold and press elements, without interruption of the manufacturing cycle.

Another object of the invention is to provide a machine as described which presents a continuous supply of slurry to the molds of a desired consistency.

Another object of the invention is to provide a bladder carrier means for expressing water from the pulp in the molds by inflation of the bladders.

Another object of the invention is to provide a bladder carrier which by virtue of the yielding construction of the bladders does not interfere with synchronized coaction and insertion and removal of the bladders from the molds.

Another object of the invention is to provide a bladder carrier as described which is reciprocable into and out of forming position, but is rotatable for removal or repair of individual bladders.

Another object of the invention is to provide a machine as described which successively applies suction to suction boxes carrying the molds and applies air pressure to the molds as required by means of valve plate structure in the rotor carrying the suction boxes.

Another object of the invention is to provide take-off press means coacting with the molds on the suction boxes.

Another object of the invention is to provide a take-off press structure which includes mold elements complementary to the molds in the suction boxes to which vacuum may be applied in cooperation with air pressure simultaneously applied to the molds in the suction boxes to remove the finished articles.

Another object of the invention is to provide take-off means as described rotatable and reciprocable for ready engagement with the molds in the suction boxes.

Another object of the invention is to provide take-off means as described including lost motion means for preventing torque binding during reciprocation thereof.

Another object of the invention is to provide a mold mounting including a grid and simple bolt means for releasably retaining the molds in the grid in position for application of suction or air pressure thereto successively.

Another object of the invention is to provide a mold structure cooperable with the grid and releasably retainable therein.

Another object of the invention is to provide a method of manufacturing articles molded from pulp which is capable of producing a large volume of finished articles in a continuous process over a relatively short period of time, with the articles having a large proportion of the fluid removed therefrom.

Other objects and advantages of the invention will become apparent as the description proceeds in accordance with the drawings in which:

FIGURE 4 is a corresponding view of the structure shown in FIGURE 3 in position to release the finished articles to a conveyor belt or the like;

FIGURE 5 is an enlarged view, partly in vertical section, of the structure shown in FIGURES 3 and 4;

FIGURE 6 is an enlarged plan view of a grid for receiving molds according to the present invention;

FIGURE 7 is a vertical sectional view of the grid shown in FIGURE 6, partly broken away and in combination with a mold assembled therewith and showing the mating engagement of a bladder therein for cooperatively forming a finished article;

FIGURE 8 is a view corresponding to the view of FIGURE 7 and showing an extraction type of insert for the mold; and FIGURE 9 is a reduced perspective view of a finished article such as a seed pot produced by the machine of the invention.

Figure 1:
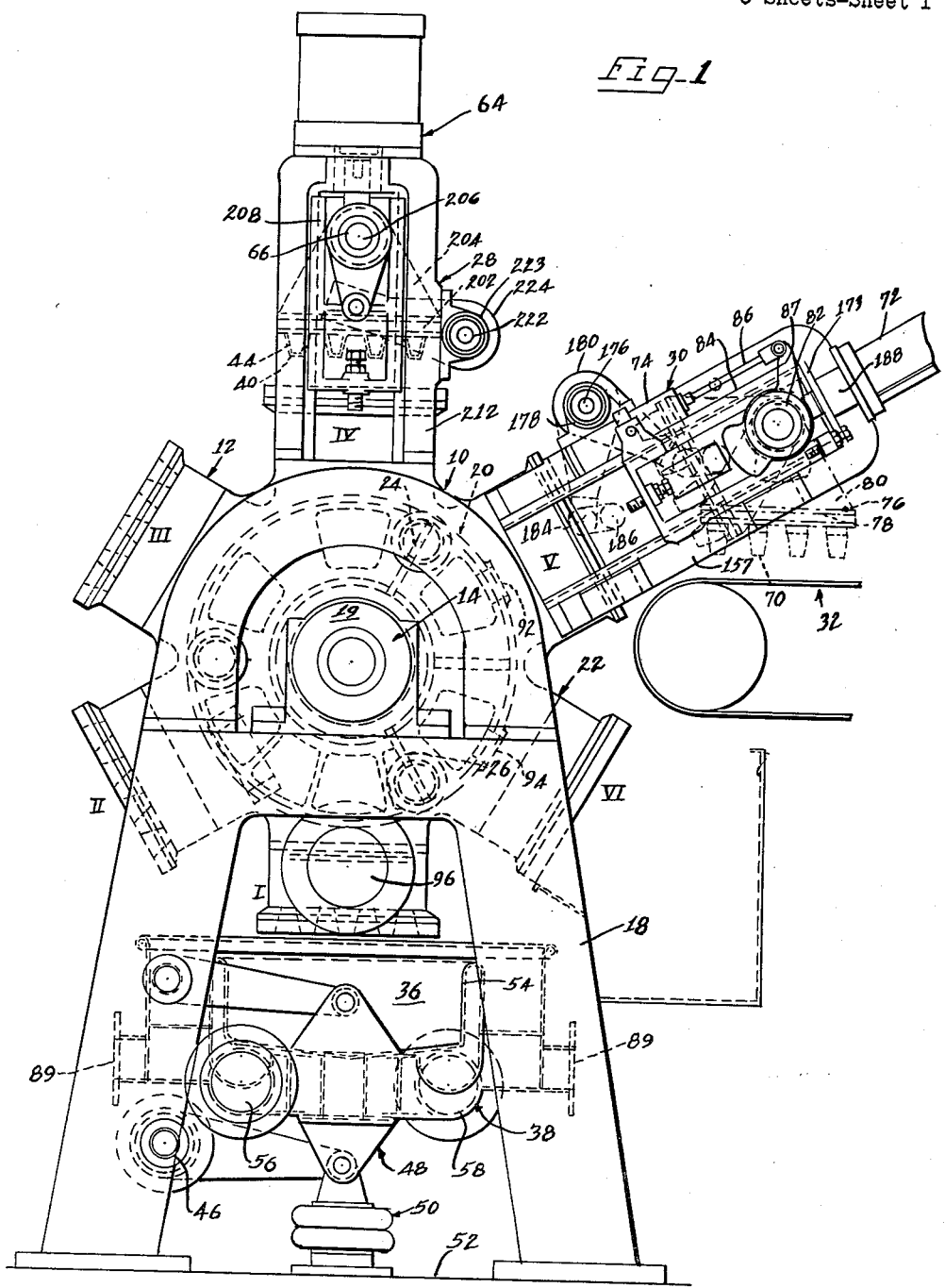
FIGURE 1 is a side elevational view of a pulp molding machine according to the present invention.

Referring now to the drawings, a pulp molding machine 10 is shown according to the present invention which includes a cylindrical array of suction boxes 12 forming a part of a rotor mounted on a central drive shaft structure 14 which is journalled in side supports 16 and 18. The drive shaft 14 may be driven by any suitable means such as to index the rotor through successive processing stages as hereinafter described, six of the suction boxes 12 being mounted on an enlarged portion 19 of the drive shaft 14 in the embodiment shown. Thus the rotor, generally indicated by reference numeral 22, will be driven so as to be intermittently indexed through ⅙ of a revolution.

Valve plate structures 20 are formed with partitions 24 and 26 therein as seen in FIGURE 1, and are mounted to receive the portion 19 rotatably therethrough to connect the suction boxes 12 successively to vacuum and to air pressure as hereinafter described.

A bladder carrier and first press station 28 is provided to mate with the successive suction boxes 12 and to express water from individual articles thus formed, and a second press arrangement 30 is mounted on the machine primarily to remove the formed articles and transfer them to a conveyor 32, also as hereinafter further described.

The articles formed may be seed pots 34, as seen in FIGURE 9, although other articles may be molded in accordance with the invention, such as egg boxes, flower pots or other structures of moldable type.

A slurry 36, such as bagasse of, for example 1½% consistency is supplied to the suction boxes 12 from a pan 38. Thus the individual articles such as the seed pots 34 are formed in individual molds 40 which are supported in a grid 42 on the top of each of the suction boxes 12, so that a large number of articles may be formed simultaneously, one hundred and thirty such molds being supported in each of the grids 42 according to the embodiment of the invention shown.

As seen in FIGURE 7, the individual molds 40 are adapted to coact with bladders 44 carried by the bladder carrier 28 to express water from the articles 34 therebetween.

The pan 38 is successively elevated to submerge the individual molds and is raised or lowered by means of a cross shaft 46 and a parallelogram linkage 48, energized by a fluid reciprocating motor and air cylinder or the like (not shown).

In order to provide an adjustable counterbalance for the linkage 48, air spring means 50 are connected thereto and supported on the floor 52 for the machine 10, and it will be appreciated that the motion of the pan 38 thus produced will be smooth and even so that the stock or slurry 36 will not be "thrown" during operation of the machine.

Figure 2:
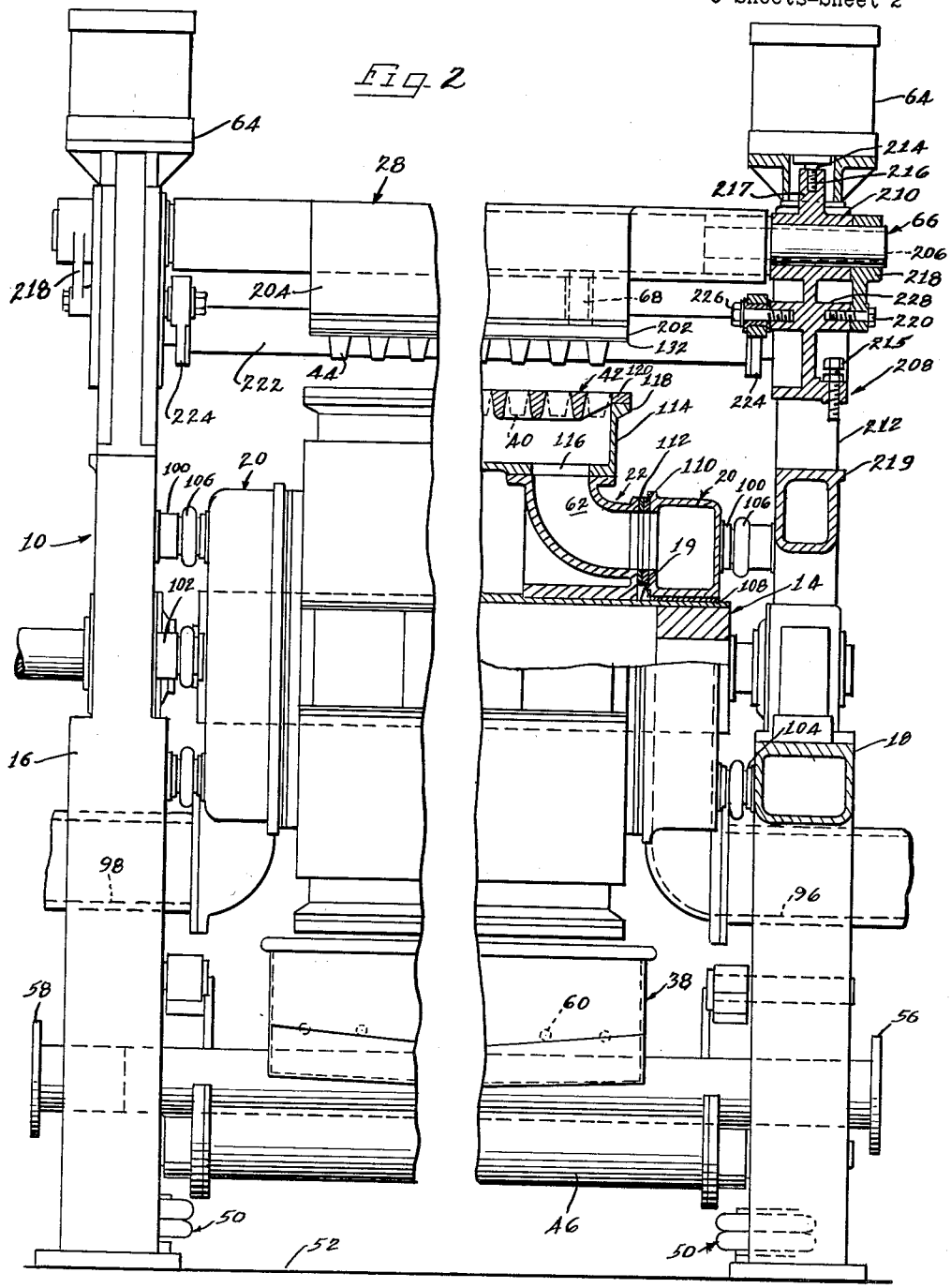
FIGURE 2 is a front elevational view of the structure shown in FIGURE 1, partly broken away.

So as to provide a continuous supply of stock of the desired consistency at a suitable level, the structure of the pan 38 provides for overflow of excess stock, which is recirculated thereto from over the rim of an inner pan 54. Thus the stock is supplied through front and back stock inlets 56 and 58 respectively from which it is injected into the inner pan 54 through a series of apertures 60, as seen in FIGURE 2, so as to agitate the stock or slurry to prevent its settling.

As indicated, the rotor 22 is adapted to rotate through six index stations which are indicated generally in FIGURE 1 by indicia I–VI. When the pan 38 is elevated to submerge the individual molds 40, suction applied through channels 62 creates a suction through the individual molds to deposit the slurry therein, and the pan is lowered and the rotor 22 indexed clockwise (in the example shown) into the station II, whereupon the stock pan 38 is moved upwardly again. The partitions 24 and 26 in the valve plate are effective to maintain suction and required drainage through the index stations I–IV, and to apply air pressure through the stations V and VI as hereinafter further described.

At position IV, the bladder carrier 28 moves the bladders 44 into engagement with the molds 40 by means of air cylinders 64 on the supports 16 and 18, or other suitable means, whereupon the bladders are expanded by fluid pressure which may be supplied through a central shaft 66 and a plurality of radial channels 68 communicating therewith. This pressing operation removes a substantial amount of the fluid from the articles 34 being formed. When the articles are rotated to station V, a second set of mating molds 70 is reciprocated by main cylinders 72 and rotated simultaneously upwardly by secondary cylinders 74 into engagement with the molds 40, corresponding cylinder means being mounted radially on each of the supports 16 and 18. In this position of the suction boxes, air is introduced beneath the molds 40 and vacuum is applied to ports 75 in the molds 70 mating therewith as shown in FIGURE 8. Thereby, the molded articles 34 are transferred from the molds 40 onto the molds 70. The press ram 76 carrying the molds 70 is then retracted by the cylinders 72 and 74 and rotated into the position shown in dotted lines in FIGURE 1. It will be seen that the ram 76 includes a suction box 78 supported on a bracket structure 80 mounted on a shaft 82 forming an air and vacuum connection for the suction box 78 through conduits 83 and journalled in slideblocks 84 by a bearing 85 for angular rotation by the cylinders 74. Thus the pistons 86 of the cylinders 74 are connected to the ends of the shaft 82 by crank arms 87 to turn the ram 76 to release position as hereinafter further described.

As the pan 38 comes into the upper position at stage I, vacuum is applied to a suction box 12 at this stage to submerge fully the surface of the box carrying the molds 40. An excess of slurry overflows from the pan 54 into the outer pan 38; and desirably, the supply to the inner pan 54 affords a continuing overflow into the outer pan 38 which may be drained by drains 89. Thus the slurry in the inner pan 54 is kept clear throughout the operation.

The immersion of the individual suction boxes 12 is of short duration, and may, for a material as described, be on the order of two to three seconds. During this time the reduced pressure within the foraminous mold draws the slurry upwardly thereinto to deposit the fiber on the foraminous walls of the mold, and a large proportion of the fluid of the slurry will thus be drawn through these walls and out to the suction connections. For example, if the pot 34 to be formed is a 2" by 2" by 2½" molded pyramid, the molds 40 may have a foraminous metal plate 88 backed by the wires 90 as hereinafter further described, with the plate 88 being 29 gauge and forming .0020" diameter holes. The amount of open area in the plate or screen 88 may be 20%, for example, and with a pulp of bagasse and a wet strength additive such as Kymene 557, the forming time may be one second and the press time one second for a total of a two second interval. The press pressure afforded by the bladders 44 may be p.s.i.g. 40, the blow p.s.i.g. may be 5 and the forming vacuum may be 5" Hg. Thereby, an amount of fluid may be removed such that after formation the pots weigh, in a construction as described, 30 to 35 grams, with 15 to 18 grams of this weight being water.

When the pots thus formed are removed by the take-off station 30, they are released to the conveyor belt 32 for drying. Any suitable oven may be used to provide a drying rate of, for example, two grams per minute. Thus an oven-drying rate of six minutes total time may be used wherein a 500° F. temperature is maintained for three minutes, a 300° F. temperature for two minutes and a 150° F. temperature for one minute. Air flow in the oven should be from the bottom to the top of the pots, and the pots should be spaced from one another at such time.

As the pan 38 is retracted, the rotor 22 is indexed once again with the vacuum being maintained as hereinabove set forth. The index part of the cycle may be on the order of two seconds.

Forming takes place by means of the inflatable pressure bladders or balloons 44. These bladders are so shaped in size as to permit free entry into the interior of the article 34 being formed.

An advantage of the invention is that the flexibility of the bladders 44 is such as to minimize or eliminate the necessity for complex mechanism to adjust for contact between the arcs formed by the rotor 22 and the path of the bladders 44 as they move into position. The combination of air under pressure delivered to inflate the bladders and the vacuum applied to the foraminous members is effective at this stage to provide a pressure differential which assists in the removal of the water from the articles being formed.

The further clockwise indexing of the rotor 22 brings the formed articles into register with the take-off station 30, and desirably the members 70 are similarly of a wire mesh or foraminous plate construction which is complementary to the interior surface of the articles 34. It will be understood, however, that the engagement of the upper surface boundaries of the articles 34 by suitably configured take-off members may be within the scope of the invention.

As soon as sealing engagement is established between the inner surface of the articles 34 and the outer surface of the upper members 70, a vacuum is established on the articles through the openings 75 in the members 70 and the valve means 20 previously referred to as affording connection to a source of suction at this time permits the application of pressurized air to the box 12 at the station V with the partitions 24 and 26 maintaining the pressure at the stations V and VI. Air connections 92 and 94 are provided for this purpose at these stations whereas, as seen in FIGURE 2, vacuum outlets 96 and 98 are provided to apply a vacuum at the stations I–IV.

Thus the valve structures 20 at each side of the rotor 22 are supported on the uprights 16 and 18 by a plurality of bracket members 100, 102, 104 for each of the said valves so that they are resiliently urged against the rotor 22 to provide successive communication with channels 62 for the individual suction boxes 12. The support members 100–104 each include cushion elements such as indicated at 106 with respect to the member 100 to accommodate slight axial movement of the valves and to maintain a sealing engagement with the rotor. Suitable spring means such as Micarta springs (not shown) may also be provided for this purpose. The valves 20 are mounted on the rotor shaft 14 by means of a bearing 108 for each of the valves, and the valves in turn carry sealing gaskets 110 cooperating with complementary annular gaskets 112 at the inlet of the conduits 62.

The suction boxes 12 may include a rectangular radially outwardly open box portion 114 having openings 116 for the channels 62 and an upper peripheral flange 118 for supporting a frame or grid 42 as shown in FIGURE 6.

The grids may have a peripheral flange 120 adapted to be bolted on the flange 118 and, as seen in FIGURES 6 and 7, radially elongated walls 122 defining suitably configured grid openings 124 for the molds 40. The molds 40 may be supported in the grid openings 124 by means of gaskets 126 surrounding the individual openings and seating on the upper surfaces of the walls 122. The wire elements or rods 90 thus reinforce the foraminous plate 88, and may be secured thereto, by any suitable means, and to a fabricated mold 128 which seats upon the gasket 126. The foraminous plate 88 desirably includes an upper outwardly turned flange 129 which in turn rests upon the mold 128 in supported relationship, and the entire structure may be held on the grid 120 by disposing a retaining insert of plastic or any other suitable material between the individual molds 128, which may be bevelled for this purpose. The retaining inserts (not shown) may then be secured to the walls 122 by bolts received in threaded openings 130 in the walls.

In accordance with the invention, the bladders 44 may be secured to a bladder carrier plate 132 on the bladder carrier 28 which may form a part of a box-like structure communicating with the passages 68 shown in FIGURE 2 for the application of pneumatic pressure through the shaft 66.

The location and number of the bladders is complementary to the location and number of the molds 40 and the bladders themselves include a pliant cup-shaped air-impervious press portion 134 which may have a downwardly tapering gradually reduced side wall and a relatively thin bottom wall as seen in FIGURE 7. The upper portion of the bladders 44 may include a thickened support portion 135 which defines a shoulder 136 thereabove for forming the upper edge or rim of the individual pots 34. Thus the thickened portion 135 is set square against the plate 132 to provide positive pressure against the pulp within the mold 40 in forming the upper edge of the pot; and the thickened portion 135 is continuous with a sleeve 138 recessed to be supported on the plate 132 and defining a passage 140 to transmit air pressure from the shaft 66 and passage 68.

Referring now to FIGURE 8, it will be seen that the construction of the cup-shaped press members 70 for the take-off stage is likewise complementary to the inner surface of the articles 34 and in this instance may include a screen or foraminous plate 142 secured by suitable means to a retaining wall 144 having an integral sleeve 146 recessed to engage a retaining sleeve 148 on the plate 150 of the suction box 78. Thus the sleeve 146 and 148 define a passage 75 for applying a vacuum to the foraminous plate 142 as previously described.

Figure 4:
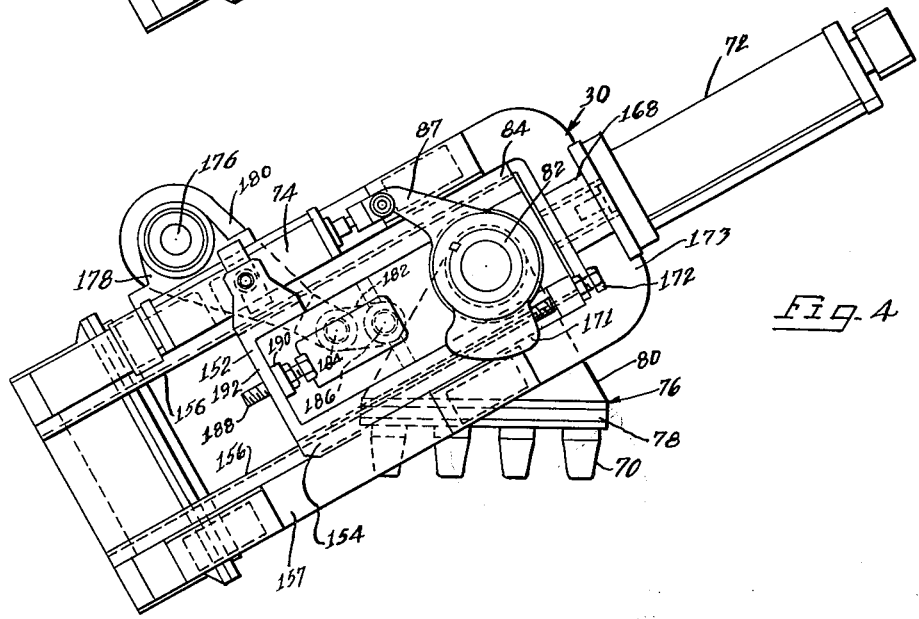

The sleeves 148 may be of rubber or other resilient material to afford a certain flexibility for the press members 70 which assists in providing an easy fit as the members 70 are inserted in the molds 40. Further, the ram 76 may be provided with a tang 152 at each end thereof as seen in FIGURES 4 and 5 adapted to mate with corresponding recesses 153 formed at the ends of the suction boxes 12, thereby to assist in aligning the extraction members 70 with the grids 42 and with the respective molds 40.

The air motors 72 actuate the slide blocks 84 so that guide flanges 154 on the slide blocks reciprocate in slideways 156 in the frames 157 secured to the supports 16 and 18, it being understood that corresponding extractor or take-off stations 30 are provided on each side of the machine for controlling the extractor pots 70.

Figure 3:
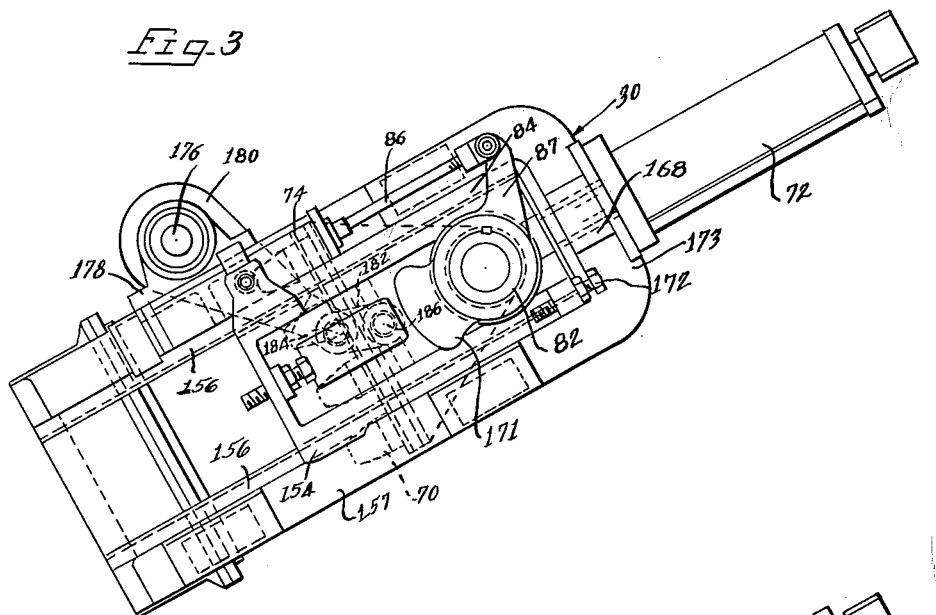
FIGURE 3 is an enlarged side elevational view of article take-off means shown in FIGURE 1, in a take-off position.

As shown in FIGURE 5, the cylinders 74 may be journalled by trunnion means 158 on the slide blocks 84 so that they may turn as the pistons 86 turn the crank arms 87. In the extracting position shown in FIGURE 3, for example, the extractor pots 70 are in radial alignment with the rotor 22 and received in the molds 40. They may be rotated 60° by the action of the pistons 86 in the retracting cycle as supported on the bracket 80 and the shaft 82. The shaft 82 and bearings 85 may be received in journal portions 160 of the slide blocks 84 which are connected to pistons 162 of the air motors 72 by suitable linkage heads 164 threadedly receiving the ends of the pistons and having threaded extensions 166 secured within the journal portions 160 of the slide blocks. Support sleeves 168 support the air motors or cylinders 72 on slide-ways 156 and define openings 170 for the pistons. The crank arms 87 may have stop segments 171 for engagement with adjustable stops 172 on the slide-ways 156 adjacent a bridge 173 joining the sleeves 168 to the slide-ways, to control the extent of angular movement of the crank arms 87. In order to synchronize the slide blocks 84, a shaft 174 is journalled by means of reduced extensions 176 in trunnions 178 on the frames 157 and crank arms 180 are connected to the slide blocks by lost motion linkages 182 pivoted at 184 and 186 to the crank arms and the slide blocks respectively. It will be noted that the pivot points 186 include removable bolts 188 having bearing portions 190 surrounded by bearings 192 and bearing sleeves 194 for the crank arms 180, the bolts 188 having threaded ends 196 received in bosses 198 in a central frame 200 for the slide blocks. Thus the connection between the slide blocks may be readily released as desired.

The plate 132 supporting the bladders 44 may form a part of a pneumatic pressure box 202 to which pressure may be introduced through the shaft 66 and passage 68, the pressure box 202 being carried on a support bracket 204 similar to the bracket 80 of the extractor means 30. Thus the shaft 66 forms a channel 206 for transmitting air pressure, and is journalled in slide blocks 208 by bearing portions 210 thereof and the slide blocks 208 are slidable in slideways 212 formed on the supports 16 and 18. The slide blocks 208 are connected to pistons 214 as by bolt means 216 in an upstanding boss 217 on bearings 210 so that they may be reciprocated by the pistons 214 as actuated by the air cylinders 64. The extent of travel of the bladders 44 thus afforded may be relatively small, as, for example, 5", to afford insertion and removal thereof with respect to the molds 40, and the travel length may be controlled by stop bolts 215 which may contact support shoulders 219 at their lower limit.

Desirably, the shaft 66 has linkage arms 218 fixed to each end thereof and joined by removable bolts 220 to the slide-blocks 208 to stabilize the pressure box 202 in position for engagement with a suction box 12. And, in order to synchronize the slide blocks 208, a shaft 222 may be journalled in trunnions 223 on the slideways 212 and connected by arms 224 to the slide blocks 208 by journal means as indicated at 226; it being noted, however, that lost motion means are provided for the arms 224 which may correspond to the structure connecting the slide blocks 84 of the extraction station 30, or otherwise, to accommodate the axial movement of the slide blocks 208. Thus the shaft 222 will maintain the slide blocks 208 in register during reciprocation. Although the pressure box 202 is normally held against angular movement, as stated, it is a simple matter to remove the bolts 220 from the slide block bosses 228 so that the pressure box and the bladders 44 carried thereby may be swung to one side for inspection or repair.

It will thus be seen that we have provided a pulp molding machine which is capable of sustained automatic operation, and which affords large volume production of molded articles of a wide variety of types and of uniform quality.

Although we have herein set forth and described our invention with respect to certain specific details and principles thereof, it will be understood by those skilled in the art that these may be varied without departing from the spirit and scope of the invention as set forth in the hereonto appended claims.

We claim as our invention:

1. A pulp molding machine comprising a rotor, a plurality of radially disposed suction boxes disposed in angularly equally spaced relation on said rotor, a plurality of fluid-permeable molds in each of said boxes, shaft means extending axially through said rotor for transmitting indexing movement thereto, support means journalling said shaft means, valve means on said support means including a vacuum portion, a fluid pressure portion and spaced outlets for said portions corresponding to indexing stations for the rotor, conduit means in said rotor communicating vacuum and fluid pressure to said suction boxes from said valve outlets at successive indexing stations of said rotor, means for supplying flowable material to be molded to successive suction boxes at one angular position relative to said rotor, said suction boxes each aligning the molds therein for simultaneous immersion in the flowable material supplied by said supplying means, means on said support means carrying a plurality of inflatable pressure members complementary to the molds in said suction boxes, means for reciprocating said pressure members into and out of said molds when said suction boxes are in register therewith, means for supplying fluid pressure to said pressure members in said molds to express fluid from the flowable materials in the molds, a plurality of fluid permeable extraction members complementary to said molds, means reciprocating said extraction members into and out of said molds when said suction boxes are in register therewith including a guide means for said extraction members extending radially inwardly toward the center of said rotor, a press ram pivotally carrying the extraction members and mounted for movement on said guide means, a first power operator connected to said press ram for moving it radially inwardly to a transfer position and radially outwardly to a retracted position, second power means swinging the extraction members pivotally on the press ram at said retracted position moving the members to a release position, and means for applying suction to said extraction members at said transfer position and releasing said suction at said release position, said valve means supplying fluid pressure to said molds when the suction boxes are in register with said extraction members at said transfer position to transfer articles from said molds to said extraction members.

2. A pulp molding machine comprising a rotor, a plurality of radially disposed suction boxes disposed in angularly equally spaced relation on said rotor, a plurality of fluid-permeable molds in each of said boxes, shaft means extending axially through said rotor for transmitting indexing movement thereto, support means journalling said shaft means, valve means on said support means including a vacuum portion, a fluid pressure portion and spaced outlets for said portions corresponding to indexing stations for the rotor, conduit means in said rotor communicating vacuum and fluid pressure to said suction boxes from said valve outlets at successive indexing stations of said rotor, means for supplying flowable material to be molded to successive suction boxes at one angular position relative to said rotor, said suction boxes each aligning the molds therein for simultaneous immersion in the flowable material supplied by said supplying means, means on said support means carrying a plurality of inflatable pressure members complementary to the molds in said suction boxes, means for reciprocating said pressure members into and out of said molds when said suction boxes are in register therewith, means for supplying fluid pressure to said pressure members in said molds to express fluid from the flowable materials in the molds, a plurality of fluid permeable extraction members complementary to said molds, means reciprocating said extraction members into and out of said molds when said suction boxes are in register therewith including a press ram carrying the extraction members with said members pivotally mounted thereon, radially extending guide rails for said press ram, a piston and cylinder first power means moving the press ram radially inwardly to carry the extraction members to a transfer position in register with the suction boxes and radially outwardly to a retracted position away from said suction boxes, a second power means carried on the press ram including a piston and cylinder connected to a crank arm on the extraction members moving the extraction members pivotally to a release position facing downwardly, and means for applying suction to said extraction members at said transfer position and releasing suction at said release position, said valve means supplying pressure fluid to said molds when the extraction members are in said transfer position to transfer articles from the molds to the extraction members.

References Cited in the file of this patent
UNITED STATES PATENTS

| | | |
|---|---|---|
| 240,091 | Chase | Apr. 12, 1881 |
| 342,176 | Carmichael | May 18, 1886 |
| 397,778 | Carmichael | Feb. 12, 1889 |
| 828,909 | Ward | Aug. 21, 1906 |
| 2,135,825 | Marguerat et al. | Nov. 8, 1938 |
| 2,234,979 | Randall et al. | Mar. 18, 1941 |
| 2,307,022 | Chaplin | Jan. 5, 1943 |
| 2,990,314 | Lietzel | June 27, 1961 |
| 3,023,806 | Reynolds | Mar. 6, 1962 |

FOREIGN PATENTS

| | | |
|---|---|---|
| 469,882 | Great Britain | Aug. 3, 1937 |